(12) United States Patent
Riedel, Jr. et al.

(10) Patent No.: US 11,530,770 B2
(45) Date of Patent: Dec. 20, 2022

(54) VIBRATION DAMPENING IN FRACTURING SYSTEMS

(71) Applicant: Caterpillar Inc., Peoria, IL (US)

(72) Inventors: Robert E. Riedel, Jr., Fox River Grove, IL (US); Solomon Austin Cong, Houston, TX (US); Peter Allan Manos, McHenry, IL (US); Christian Joseph Murray, Cypress, TX (US)

(73) Assignee: Caterpillar Inc., Peoria, IL (US)

( * ) Notice: Subject to any disclaimer, the term of this patent is extended or adjusted under 35 U.S.C. 154(b) by 194 days.

(21) Appl. No.: 16/992,309

(22) Filed: Aug. 13, 2020

(65) Prior Publication Data

US 2022/0049809 A1 Feb. 17, 2022

(51) Int. Cl.
| | | |
|---|---|---|
| *F16L 55/04* | (2006.01) | |
| *F16L 41/03* | (2006.01) | |
| *F16F 15/08* | (2006.01) | |
| *E21B 43/26* | (2006.01) | |

(52) U.S. Cl.
CPC ............ *F16L 55/041* (2013.01); *E21B 43/26* (2013.01); *E21B 43/2607* (2020.05); *F16F 15/08* (2013.01); *F16L 41/03* (2013.01)

(58) Field of Classification Search
CPC ......... F16L 55/041; F16L 41/03; E21B 43/26; E21B 43/2607; F16F 15/08
See application file for complete search history.

(56) References Cited

U.S. PATENT DOCUMENTS

| | | | |
|---|---|---|---|
| 9,568,138 B2 | 2/2017 | Arizpe et al. | |
| 10,533,399 B2 | 1/2020 | Ceccon De Azevedo et al. | |
| 11,022,526 B1* | 6/2021 | Yeung | F04B 17/05 |
| 2015/0000766 A1* | 1/2015 | Arizpe | F16L 55/035 137/561 A |
| 2017/0037717 A1* | 2/2017 | Oehring | F01D 15/10 |
| 2017/0241243 A1 | 8/2017 | Gomes Martins et al. | |
| 2019/0024470 A1 | 1/2019 | Cummins | |
| 2019/0331100 A1* | 10/2019 | Gable | F04B 11/005 |

FOREIGN PATENT DOCUMENTS

| | | | |
|---|---|---|---|
| CN | 205936563 | 2/2017 | |
| CN | 107806329 A | 3/2018 | |
| CN | 112302609 A * | 2/2021 | ............ E21B 43/26 |

* cited by examiner

*Primary Examiner* — James G Sayre

(57) ABSTRACT

A fracturing system includes a plurality of junctions mounted on a chassis, such as a trailer chassis. Pressurized fluid is provided to the plurality of junctions via a plurality of conduits, e.g., from one or more pumps. The junctions and the conduits are independently mounted and independent vibration dampening systems damp vibrations at the individual mounts. Vibration of individual of the junctions may be damped by a first dampening system having first dampening properties and individual of the conduits may be damped by a second dampening system having second dampening properties different from the first dampening properties.

20 Claims, 4 Drawing Sheets

VIBRATION DAMPENING IN FRACTURING SYSTEMS

TECHNICAL FIELD

The present disclosure relates to hydraulic fracturing systems. More specifically, the present disclosure relates to improved dampening techniques to reduce wear in hydraulic fracturing systems.

BACKGROUND

Hydraulic fracturing is a well-stimulation technique in which pressurized hydraulic fracturing fluid is pumped into a wellbore to form factures in a rock formation surrounding the wellbore. Introduction of the pressurized fluid enhances the natural fracturing of the rock formation, e.g., to increase the permeability of the rock formation, thereby improving recovery of water, oil, natural gas, and/or other fluids. To fracture rock formations, the hydraulic fracturing fluid is injected into the wellbore at a pressure and rate sufficient to exceed a fracture gradient of the target formation. Some conventional arrangements use a plurality of pumps to pressurize the hydraulic fracturing fluid. Outputs from the respective pumps are received at a fracturing manifold, which then delivers the hydraulic fracturing fluid to an injection point (e.g., a frac tree).

As a result of the high pressures and flow rates necessary for fracturing rock formations, components of fracturing systems are subjected to large stresses during operation. Often, the fracturing system includes a number of components that are welded together. In use, pressure generated by the pumps cause tensile and shear stresses at conduit junctions. These stresses can cause damage, often as stress cracks or fractures, at or near the welds. This damage can lead to leaking of fluids from the fracturing system, which can be an environmental hazard and/or inhibit proper functioning of the system, and in some cases, can lead to system failure. Conventionally, smaller stress cracks are welded, e.g., to prevent leakage, or entire components are replaced, discarding the damaged components. Accordingly, it may be useful to provide improved processes and systems that reduce stresses caused by normal operations to increase the life of components of the fracturing system, e.g., to reduce downtime associated with time-consuming repairs and/or waste.

An example hydraulic fracturing manifold assembly is described in U.S. Pat. No. 9,568,138 (hereinafter referred to as the '138 patent). In particular, the '138 patent describes a manifold assembly that includes a skid and high- and low-pressure manifolds connected to the skid. In examples of the '138 patent, y-fittings and isolation valves are mounted on an upper wing mounting bracket. Also in the '138 patent, the upper wing mounting bracket is vertically spaced from a lower wing mounting bracket, and vibration isolators are disposed between the upper wing mounting bracket and the lower wing mounting bracket. The '138 patent does not, however, describe a fracturing system in which motion of individual components, e.g., motion resulting from normal use of the system, are dampened independent of other components. For instance, the '138 patent describes vibration isolators between mounting plates supporting a plurality of system components. As a result, the system described in the '138 patent does not, among other things, provide individual dampening of discrete components of the system.

Example embodiments of the present disclosure are directed toward overcoming the deficiencies described above.

SUMMARY

An example fracturing manifold includes a chassis; a junction; a conduit in fluid communication with the junction and providing a supply of pressurized fluid to the junction; a first mount supporting the junction; a first vibration dampening system coupling the first mount to the chassis, the first vibration dampening system facilitating a first movement of the first mount and the junction relative to the chassis; a second mount supporting the conduit; and a second vibration dampening system coupling the second mount to the chassis. The second vibration dampening system facilitates a second movement of the second mount and the conduit relative to the chassis, and the second movement is different from the first movement.

An example method of configuring a manifold for use in a hydraulic fracturing system includes providing a support structure; providing a junction for securing to the support structure; configuring a first vibration dampening system to dampen vibration of the junction relative to the support structure and secure the junction to the support structure, the first vibration dampening system having first vibration dampening properties; providing a hydraulic fracturing component for fluid connection to the junction; configuring a second vibration dampening system to dampen vibration of the hydraulic fracturing component relative to the support structure and secure the hydraulic fracturing component to the support structure, the second vibration dampening system having second vibration dampening properties different from the first vibration dampening properties; and fluidly connecting the hydraulic fracturing component to the junction.

In a further example, a fracturing manifold system includes a moveable support structure comprising a trailer or a skid; a plurality of junctions arranged in series; a conduit in fluid communication with a junction of the plurality of junctions, the conduit supplying high-pressure fluid to the junction from a pump; a first vibration dampening system coupled to the support structure and to the junction and having first vibration dampening properties to dampen vibration of the junction relative to the moveable support structure; and a second vibration dampening system coupled to the support structure and to the conduit and having second vibration dampening properties to dampen vibration of the conduit relative to the moveable support structure.

DETAILED DESCRIPTION

This disclosure generally relates to vibration dampening in hydraulic fracturing systems. Although examples of this disclosure are directed to hydraulic fracturing systems and are shown with reference to specific components and arrangement, concepts described herein may be applicable to other components and/or arrangements; the disclosure is not limited to the specific manifold assemblies or systems described/disclosed. Wherever possible, the same reference numbers will be used through the drawings to refer to the same or like features.

Figure 1:
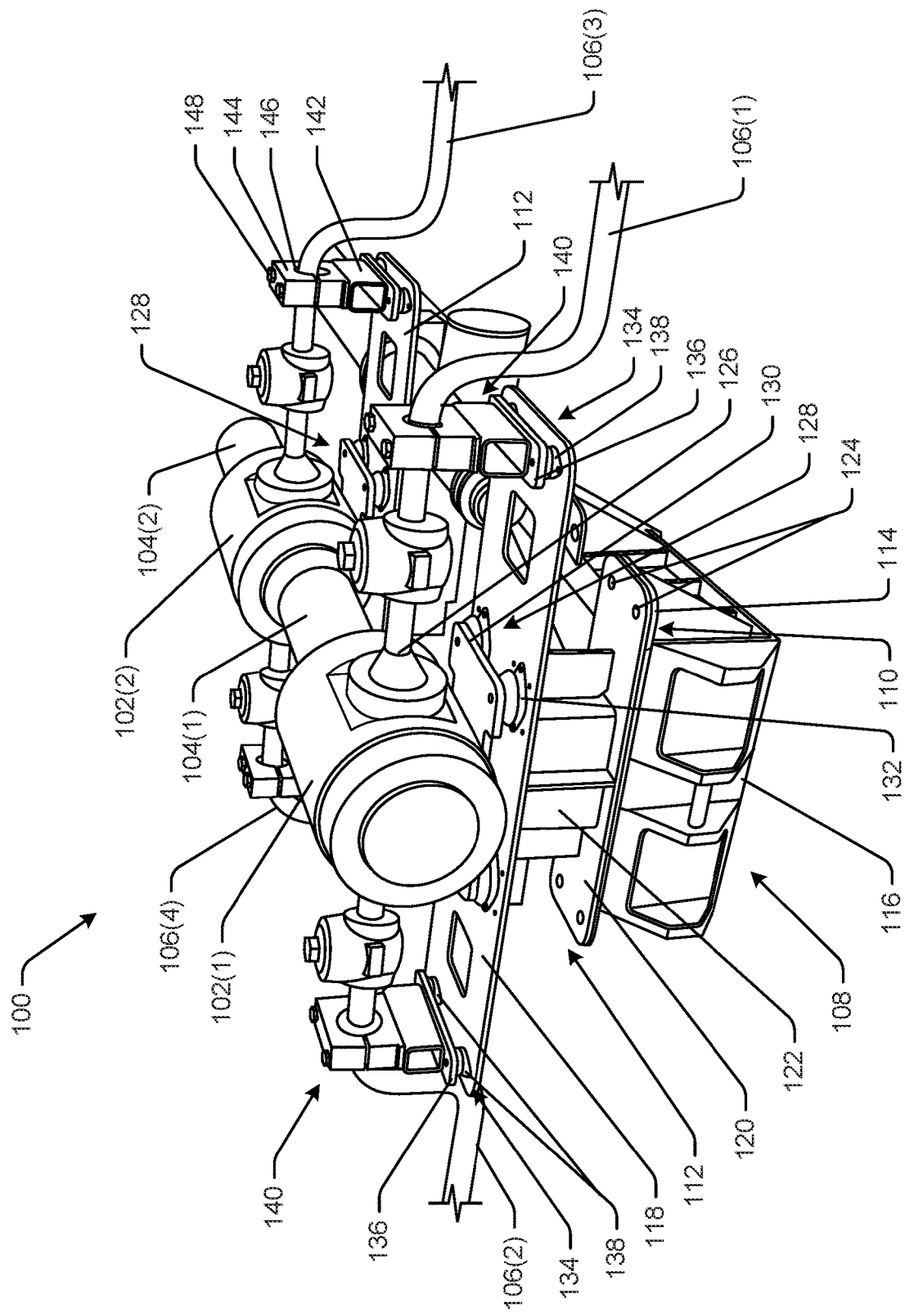
FIG. 1 illustrates an example portion of a hydraulic fracturing system illustrating component dampening, in accordance with an example of the present disclosure.

FIG. 1 depicts a portion of a hydraulic fracturing manifold 100 for use in an example hydraulic fracturing system. For instance, the manifold 100 may be used to implement a well-stimulation technique that requires high-pressure injection of fracturing fluid into a well and corresponding wellbore in order to hydraulically fracture a rock formation surrounding the wellbore. While the description provided herein describes hydraulic fracturing in the context of wellbore stimulation for oil and gas production, it is to be understood that other uses of hydraulic fracturing are contemplated herein. For example, hydraulic fracturing systems described herein may be used to stimulate groundwater wells, to dispose of waste by injection, to measure stress in the ground, to precondition and/or induce cave-ins for mining, to improve electrical generation in geothermal systems, or the like.

As illustrated in FIG. 1, the manifold 100 includes a number of components for conveying fracturing fluids to implement well-stimulation. For instance, FIG. 1 illustrates that the manifold 100 includes a first junction 102(1) and a second junction 102(2). Although FIG. 1 shows only the first junction 102(1) and the second junction 102(2), the manifold 100 can include more or fewer junctions. Herein, a plurality of junctions, which may include the first junction 102(1), the second junction 102(2), and/or one or more additional junctions may be referred to as "the junctions 102." As also illustrated in FIG. 1, the first junction 102(1) and the second junction 102(2) are in fluid communication via a first conduit 104(1). A second conduit 104(2) is also illustrated. The second conduit 104(2) may fluidly connect the second junction 102(2) to an additional junction (not shown), a fracturing head, or other component. In examples, fluid in the first junction 102(1) may flow to the second junction 102(2) via the first conduit 104(1). Fluid from the second junction 102(2) may then flow downstream, e.g., to another junction, via the second conduit 104(2).

The junctions 102 are configured to receive pressurized fluid via one or more fluid inputs, conduits, or flowlines. Herein, to avoid confusion with the conduits 104, the term "flowline" is used to describe the conduits providing high-pressure fluid to the junctions 102, as detailed further herein. However, the term "flowline" and "conduit" can be used interchangeably and are intended to be synonymous. Specifically, the first junction 102(1) is illustrated as being in fluid communication with a first flowline 106(1) and a second flowline 106(2). Similarly, the second junction 102(2) is illustrated as being in fluid communication with a third conduit, e.g., a third flowline 106(3) and a fourth flowline 106(4). Collectively, a plurality of flowlines, which can include one or more of the first flowline 106(1), the second flowline 106(2), the third flowline 106(3), the fourth flowline 106(4), and/or one or more additional flowlines, are referred to herein as "the flowlines 106." Although not illustrated in FIG. 1, each of the flowlines 106 may be in fluid communication with one or more pumps. Such pumps are often disposed on one or more trailers arranged proximate the manifold 100, e.g., for fluid connection. The specific configuration of the pump(s) may vary, and, in some instances, more than one type of pump may be used on a fracturing site. In some examples, a discrete pump may be associated with each of the flowlines 106, while in still further examples a plurality of pumps may be associated with each of the flowlines. The pump(s) may include one or more hydraulic fracturing pump(s), which can include various types of high-volume hydraulic fracturing pumps such as triplex or quintuplex pumps. Additionally, and/or alternatively, the pump(s) may include other types of reciprocating positive-displacement pumps or gear pumps. The pump(s) required and corresponding designs thereof may vary depending on the fracture gradient of the rock formation that will be hydraulically fractured, the number of pumps used, the flow rate necessary to complete the hydraulic fracture, the pressure necessary to complete the hydraulic fracture, or the like. A hydraulic fracturing system including the manifold 100 may include any number of trailers having pumps thereon to achieve a predetermined rate and pressure. The exact configuration of each pump trailer may vary from trailer to trailer and/or may vary from site to site.

As illustrated in FIG. 1, the junctions 102 and the flowlines 106 are mounted or otherwise coupled to a support structure 108. As detailed further herein, the support structure 108 may include a chassis (e.g., integrated into a trailer or other movable assembly), a trailer, a skid, or other movable support structure. In other examples, the support structure 108 may be generally stationary or fixed. The support structure 108 includes a number of different mounting surfaces, mounting holes, and/or other features for receiving and/or securing components of the manifold 100. In some instances, the support structure 108 can be fabricated from a number of metal plates, weldments, gussets, or other components.

In the illustrated example, the support structure 108 includes a mounting surface 110 (obscured by the mounting structure 112 in FIG. 1) on which a mounting structure 112 is disposed. The mounting surface 110 may be provided, at least in part, by one or more wings 114 extending laterally outwardly from a central portion 116 of the support structure 108. Instances of the mounting structure 112 are coupled to and supported by one or more wing plates located on the support structure 108. Moreover, the mounting structures 112 are configured to support the junctions 102 on the support structure 108.

In FIG. 1, the mounting structure 112 includes a top portion 118, a bottom portion 120, and a middle portion 122 extending between the top portion 118 and the bottom portion 120. In the example, the top portion 118 and the bottom portion 120 are generally horizontal and the middle portion 122 extends generally vertically between the top portion 118 and the bottom portion 120. Accordingly, the mounting structure 112 may be a substantially T- or I-shaped mounting structure. In some instances, the top portion 118, the bottom portion 120, and the middle portion 122 may be welded, e.g., as a single weldment. In other instances, the portions may be otherwise secured to each other, e.g., using fasteners or the like. The bottom portion 120 may be configured to rest on and be coupled to the support structure 108, which, as noted above, may be a trailer, a skid, or the like. For instance, the mounting structure 112 may be coupled to the support structure 108 via one or more fasteners. In the illustrated example, the bottom portion 120 of the mounting structure 112 includes a plurality of first apertures 124 arranged at corners or about its periphery. The first apertures 124 are arranged in a pattern to align with second apertures (not visible in FIG. 1) in the support structure 108 when the mounting structure 112 is properly positioned on the support structure 108. For instance, the second apertures may be disposed through the wings 114. In this arrangement, a fastener passes through one of the first apertures 124 in the mounting structure 112 and a corresponding one of the second apertures in the support structure 108 to secure the mounting structure 112 to the support structure 108. In other examples, the mounting structure 112 may be welded or otherwise secured to the support structure 108.

Instances of the mounting structure 112 may be provided in number corresponding to a number of the junctions 102. Specifically, each instance of the mounting structure 112 may be configured to support one of the junctions 102 and the flowlines 106 associated with that junction. For example, a first instance of the mounting structure 112 may be configured to support the first junction 102(1), as well as the first flowline 106(1) and the second flowline 106(2) and other components associated therewith. Similarly, a second instance of the mounting structure 112 is provided to support the second junction 102 (2), the third flowline 106 (3) and the fourth flowline 106 (4). In examples, the individual junctions 102 and/or the flowlines 106 may be coupled to or supported on the top portion 118 of the mounting structure 112 via one or more fasteners (e.g., nuts and bolts, screws, etc.).

In some conventional systems, the junctions 102 and the flowlines 106 may be fastened directly to the mounting structure 112 and/or may be mounted on mounts specifically configured for direct attachment to the mounting structure 112. However, and as detailed above, the manifold 100 is subjected to high stresses during operation, and creating static connections between elements of the manifold 100 can result in unwanted wear and/or damage. Without limitation, in some instances, the flowlines 106 providing pressurized fluid to the junctions 102 may be welded proximate a region 126 at which the flowlines 106 meet the junctions 102. While the region 126 may include a weld that is particularly prone to stress fracturing over time, the region 126 is illustrated only as an example of a portion of the manifold 100 that may fail during normal operation. Other areas of the manifold 100 that may be prone to failure can include, but are not limited to, other positions at which junctions or transitions occur, which welds are present, or other areas.

In examples of this disclosure, wear at areas such as the region 126 is reduced by dampener systems in association with components of the manifold 100. For instance, FIG. 1 illustrates a junction vibration dampening system 128. The junction vibration dampening system 128 includes a junction mounting plate 130 to which the junction 102(1) is affixed. In some examples, the first junction 102(1) may be fixed to the junction mounting plate 130 using fasteners or the like, or, in other instances, the junction mounting plate 130 may be a mounting structure that is integrally formed with the junction 102(1). Conventionally, the junction mounting plate 130 may provide a bolt- or hole-pattern for securing the junction 102(1) to a mounting structure such as the mounting structure 112. However, in implementations of this disclosure, the junction vibration dampening system 128 includes a plurality of vibration dampeners 132 disposed between the junction mounting plate 130 and the top portion 118 of the mounting structure 112. In the illustrated example, four instances of the vibration dampeners 132 (of which three are visible in FIG. 1) are associated with the first junction 102 (1). In other examples, the junction vibration dampening system 128 may include more or fewer instances of the vibration dampeners 132. Moreover, although in the illustrated example the vibration dampeners 132 are arranged proximate corners of the junction mounting plate 130, in other examples, the vibration dampeners 132 may be disposed at other positions between the junction mounting plate 130 and the mounting structure 112. As also shown in FIG. 1, another instance of the junction vibration dampening system 128 is associated with the second junction 102(2).

The manifold 100 may also include additional vibration dampening systems. Specifically, FIG. 1 illustrates instances of a flowline vibration dampening system 134 including a flowline support mounting plate 136 and a plurality of flowline vibration dampeners 138. The flowline support mounting plate 136 is a structure to which a flowline support 140 may be affixed. In some examples, the flowline support 140 may be fixed to the flowline support plate 136 using fasteners or the like, or, in other instances, the flowline support plate 136 may be integrally formed with the flowline support 140, e.g., via a weld or the like. Conventionally, a portion of one of the flowlines 106 is retained in or otherwise supported by the flowline support and the flowline support plate 136 may provide apertures or other features for securing the flowline support 140 to the mounting structure 112. However, in implementations of this disclosure, the flowline vibration dampening system 134 includes the flowline vibration dampeners 138 disposed between the flowline support mounting plate 136 and the top portion 118 of the mounting structure 112. In the illustrated example, to instances of the flowline vibration dampeners 138 are associated with each instance of the flowline support plate 136 although more or fewer of the flowline vibration dampeners 138 may be used.

In the embodiment illustrated in FIG. 1, the flowline support 140 includes a spacer 142 supporting a clamp 144. In the illustrated example, the spacer 142 may be formed from a section of hollow bar stock. The clamp 144 may define a circular cutout 146 sized to receive one of the flowlines 106. In some examples, a bearing may be captured in the circular cutout 146 and the flowline may be passed through the bearing. In the example of FIG. 1, bolts 148 may be passed through openings in a top of the clamp 144 and threaded into or otherwise received in holes in the bottom of the clamp 144 and/or in the spacer 142. The illustrated example of the flowline support 140 is for example only. Any structure or structures that support or otherwise mount the flowlines 106 to the manifold 100 may be used in place of the illustrated flowline support 140.

In the illustrated embodiment of FIG. 1, the first instance of the flowline vibration dampening system 134 is associated with the first flowline 106 (1) and a second instance of the flowline vibration dampening system 134 is associated with the second flowline 106 (2). Similarly, instances of the flowline vibration dampening system 134 also are associated with the third flowline 106 (3) and with the fourth flowline 106 (4). Although the instances of the flowline vibration dampening system 134 are illustrated as being substantially identical, in some instances, scrap further herein, the flowline vibration dampening system may be modified for different instances of the flowlines 106.

Each instance of the junction vibration dampening system 128 provides vibration dampening for one of the junctions 102. Moreover, each instance of the flowline vibration dampening system 134 provides vibration dampening for one of the flowlines 106 feeding pressurized fluid into one of the junctions 102. Accordingly, the junctions 102 and the flowlines 106 are independently dampened, providing increased dampening relative to conventional systems. In examples, the vibration dampeners 132 and/or the flowline vibration dampeners 138 may provide for dampening in multiple degrees of freedom. For example, the dampeners may provide up to 6-degrees of freedom, e.g., to dampen translational motion along each of X-, Y-, and Z-axes and rotational motion about each of those axes.

Moreover, because techniques describe herein provide independent dampening of components of the manifold 100, dampening for each of those components may be customized or varied. In the example of FIG. 1, the junction vibration dampening system 128 includes four instances of the vibration dampeners 132, whereas individual instances of the flowline vibration dampening system 134 include two instances of the flowline vibration dampeners 138. Moreover, and although FIG. 1 is not to scale, the vibration dampeners 132 may be larger than the flowline vibration dampeners 134. In examples of this disclosure, the vibration dampeners 132 can be provided in size and/or number based at least in part on a loading capacity. For instance, the loading capacity can be based at least in part on a mass or weight of the associated junction 102, a mass or weight of the junction mounting plate 130, and/or a mass or weight of other proximate components. Similarly, the flowline vibration dampeners 138 may be provided in size and/or number based at least in part on a mass or weight of the associated flowline 106, the flowline support 140, and/or other proximate components. In some examples, the vibration dampeners 132 and/or the flowline vibration dampeners 138 may include one or more polymers, one or more metals, and/or other materials. The vibration dampeners 132 and/or the flowline vibration dampeners 138 may be selected based on hardness (e.g., durometer) rating, vibration frequencies (e.g., a range of vibration frequencies), or other factors. Without limitation, the vibration dampeners 132 associated with the junction vibration dampening system 128 may have a size and hardness rating (and may be provided in number) based at least in part on the mass of the junction 102 and/or based on vibration frequencies associated with the junction 102. Similarly, the flowline vibration dampeners 138 associated with an instance of the flowline vibration dampening system 134 may have a size and hardness (and may be provided in number) based at least in part on the mass of the flowline 106.

Using the junction vibration dampening system 128 and the flowline vibration dampening systems 134, the manifold 100 provides improved performance over conventional manifolds. For instance, by reducing the impact of vibration independently at specific components of the manifold hundred, the impact of high stresses generated in the manifold 100 during normal operation may reduce fatigue a fixed junctions, such as that the region 126. Reducing this impact can provide longer life of components associated with the manifold 100, thereby minimizing downtime of the manifold 100 and increasing productivity at the manifold 100. Vibration dampening using techniques described in this application can also prevent wear caused in transit, e.g., when the manifold 100 is mounted on a trailer or skid, or is otherwise intended for transport between job sites and/or locations on job sites. The vibration dampening systems described herein can also prevent unwanted wear caused by abnormal use of components associated with the manifold 100. For example, and without limitation, a malfunctioning pump system may create stresses in excess of those occurring during normal operation, and the vibration dampening techniques described herein may limit effects of such stresses.

Figure 2:
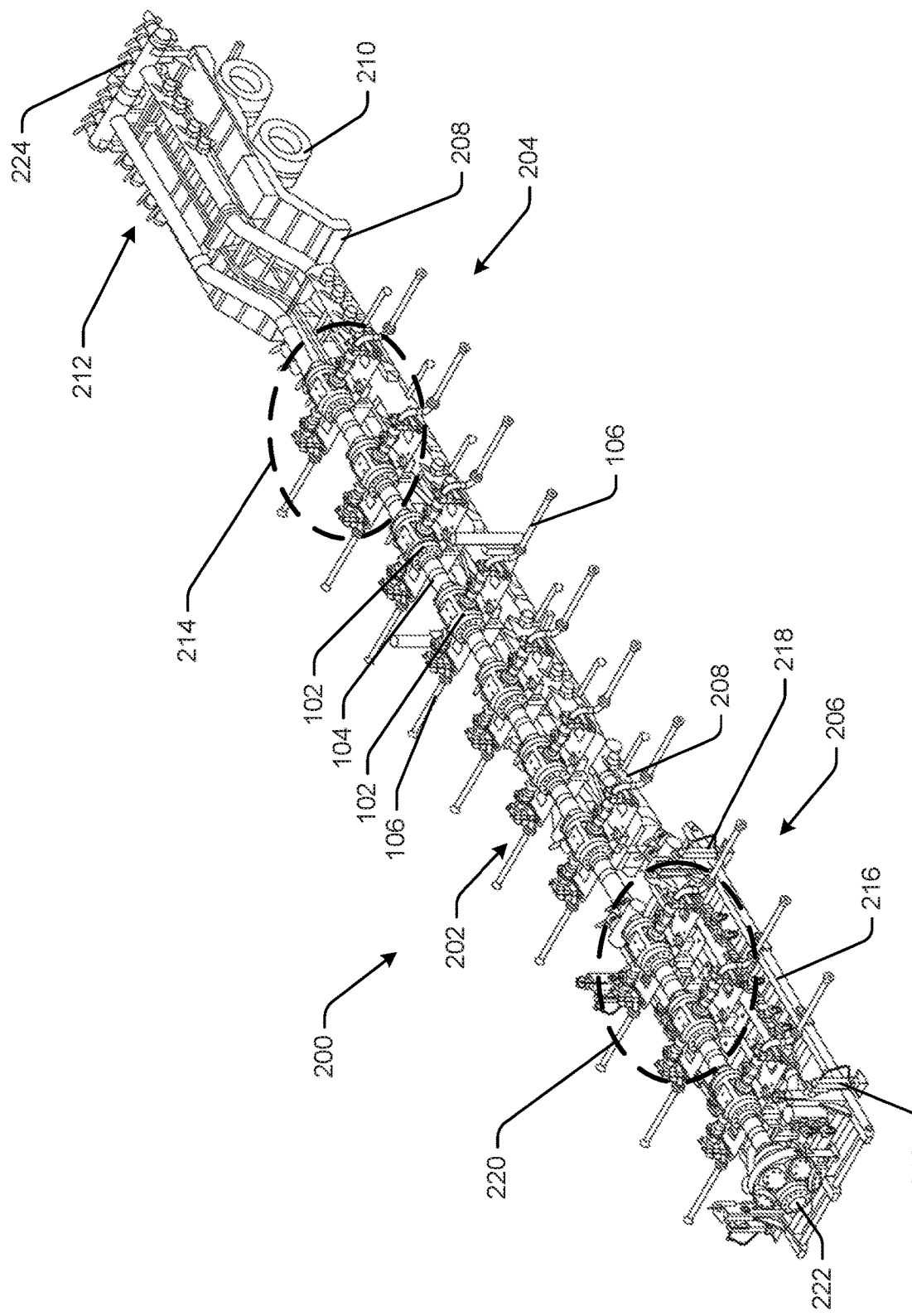
FIG. 2 is an example hydraulic fracturing system including elements shown in FIG. 1, in accordance with an example of the present disclosure.

As noted above, the portion of the manifold 100 illustrated in FIG. 1 can be incorporated in a number of fracturing systems. FIG. 2 illustrates an example fracturing system 200 including an example manifold 202 that may incorporate the portion of the manifold 100. More specifically, the fracturing system 200 illustrated in FIG. 2 is a modular fracturing system that includes a trailer portion 204 including a first segment of the manifold 202 and a skid portion 206 including a second segment of the manifold 202. The manifold 202 includes a number of instances of the junctions 102 (ten in the illustration) connected via instances of the conduit 104. The manifold 202 also includes two of the flowlines 106 associated with each of the junctions 102 (e.g., for a total of 20 flowlines in FIG. 2).

The trailer portion 204 of the manifold 202 includes a chassis 208 and tires 210 proximate a first end 212 of the chassis 208. In the illustrated example, the chassis 208 may provide functionality of the support structure 108 of FIG. 1, e.g., to support the junctions 102 and/or other components of the manifold 202. The tires 210 may facilitate transport of the manifold 202, e.g., by a truck or tractor (now shown)In the example of FIG. 2, the chassis 208 supports seven junctions 102, each having two associated instances of the flowlines 106. A region 214 in FIG. 2 includes two instances of the junctions 102 in the trailer portion 204 of the manifold 202. The portion of the manifold 202 in the region 214 may be the portion of the manifold 100 including the vibration dampening systems detailed above. Moreover, each instance of the junctions 102 on the trailer portion 204 of the manifold may include the junction vibration dampening system 128 and each instance of the flowlines 106 may include the flowline vibration dampening system 134.

The skid portion 206 of the manifold 202 includes a support structure 216 which may be supported by one or more legs 218. In the illustrated example, the support structure 216 may provide functionality of the support structure 108 of FIG. 1, e.g., to support the junctions 102 and/or other components of the manifold 202. In the example of FIG. 2, the support structure 216 of the skid portion 206 supports three junctions 102, each having two associated instances of the flowlines 106. A region 220 in FIG. 2 includes two instances of the junctions 102 in the skid portion 206 of the manifold 202. The portion of the manifold 202 in the region 220 may be the portion of the manifold 100 including the vibration dampening systems detailed above. Moreover, each instance of the junctions 102 on the skid portion 206 of the manifold 202 may include the vibration dampening system 128 and each instance of the flowlines 106 may include the flowline vibration dampening system 134. In the example of FIG. 2, the skid portion 206 of the manifold 202 also includes a fracturing head 222.

As will be appreciated from the foregoing, the techniques described herein for vibration dampening may be applied to a trailer-based fracturing system, a skid-based fracturing system, or any other type of fracturing system that includes junctions in fluid lines and communication with those junctions. In some examples, fewer than all of the junctions 102 may include the junction vibration dampening system 128 and fewer than all of the flowlines 106 may include the flowline vibration dampening system 134. Alternatively or additionally, instances of the junction vibration dampening system 128 and/or of the flowline vibration dampening system 134 may have varied vibration dampening properties, configurations, or arrangements. Without limitation, certain of the junctions 102 and/or of the flowlines 106 may be affected by different stresses, e.g., based on their proximity to other components, their position along the manifold 202, or the like. Because techniques described herein provide for independent dampening of components of the manifold too much too, customized dampening can be provided, as necessary.

In operation, the manifold 202 facilitates transmission of fracturing fluid. For instance, the manifold 202 receives high-pressure fracturing fluid via the flowlines 106, e.g., from pumps (not shown), prior to injecting the fracturing fluid into a well. In some examples, the chassis 208 and/or the support structure 216 of the skid portion 206 may carry further components to receive and distribute low-pressure fracturing fluid. For instance, low-pressure fracturing fluid may be received from a blender (not shown) via one or more inlet ports 224 arranged proximate the first end 212 of the trailer portion 204. The low-pressure fluid is then carried to the pumps for pressurization and return via the flowlines 106.

The blender may combine proppant received from a proppant storage unit with fluid received from a hydration unit. In some examples, the proppant storage unit may include a dump truck, a truck with a trailer, one or more siloes, or other type of container. The hydration unit may receive water from one or more water tanks. In some examples the hydraulic fracturing system may receive water from water pits, water trucks, water lines, and/or any other suitable water source of water. The hydration unit adds fluid additives to the water such as polymers or other chemical additives. Such additives may increase the viscosity of the fracturing fluid prior to mixing the fluid with proppant in the blender. The hydration unit also mixes additives into the fracturing fluid such that the fracturing fluid includes an appropriate pH for injection into a targeted formation surrounding the wellbore. The fluid additives may be stored in the hydration unit. Additionally, and/or alternatively, the hydration unit may be in fluid communication with one or more fluid additive storage units (not shown) that store fluid additives that are added to the fracturing fluid via the hydration unit. The hydration unit may include one or more tanks, pumps, gates, or the like.

The low-pressure fluid from the blender may then be transferred to the pumps via low pressure flow-lines connected to fluid outlets on the manifold 202. The pumps return high-pressure fluid to the manifold 202, via the flowlines 106. In the illustrated examples, the junctions 102 include a port on either side of the junction 102 to receive high-pressure fluid from two separate pump systems. In other examples, more or fewer flowlines 106 may provide high-pressure fluid to the junctions 102. The junctions 102 combine the high-pressure fracturing fluid received from the fracturing pumps and direct the high-pressure fluid to the fracturing head 222. In the illustrated example the fracturing head 222 is on the support structure 216 of the skid portions 206 of the manifold 202, although the fracturing head may be independently or otherwise supported. Moreover, when the skid portion 206 is not used, e.g., only the trailer portions 204 is used, the fracturing head 222 may be otherwise supported, e.g., on the chassis 208. The fracturing head 222 delivers the high-pressure fracturing fluid to a frac tree located on a wellhead during a hydraulic fracturing process. In some examples, the fracturing head 222 may be fluidly connected to multiple wellheads. During a hydraulic fracturing process, the wellheads may include frac trees that are installed on individual wellheads.

As will be appreciated, the arrangement of FIG. 2 is provided for example only. Depending on the application, more or fewer of the junctions 102 may be required, e.g., depending on a desired pressurization, number of pumping systems, and the like. In some instances, only the trailer portion 204 of the manifold 202 may be used or only the skid portion 206 may be used. However, regardless of the configuration, aspects of this disclosure can provide independent dampening of components of the manifold 202. Instances of dampening systems can have tailored dampening components, e.g., based on the mass, weight, and/or other characteristics of the supported component.

Figure 3:
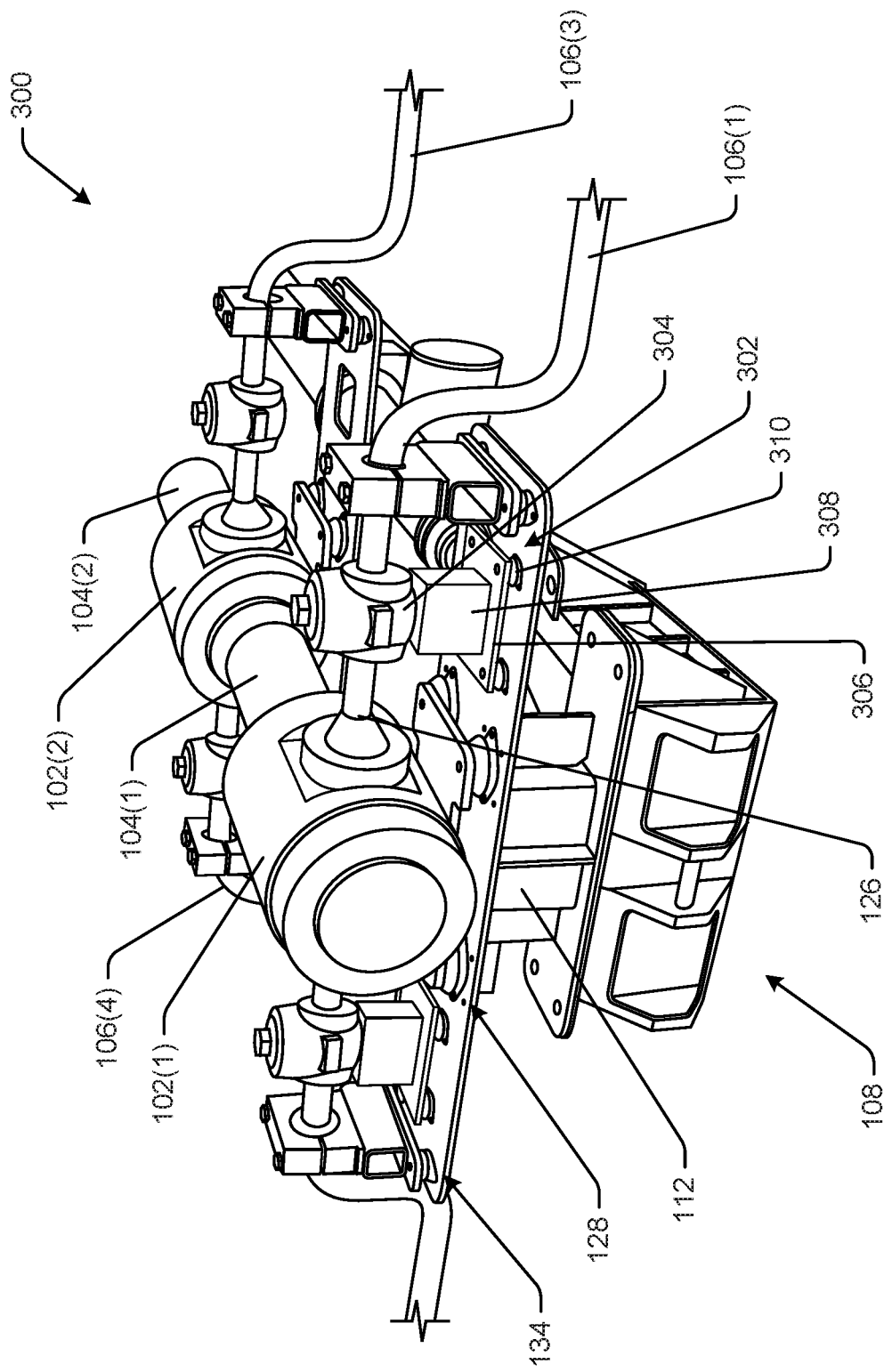
FIG. 3 is another example portion of a hydraulic fracturing system illustrating component dampening, in accordance with another example of the present disclosure.

Although the examples of FIGS. 1 and 2 illustrate discrete junction vibration dampening systems 128 and discrete flowline vibration dampening systems 134, e.g., for individual of the junctions 102 and the flowlines 106, aspects of this disclosure can provide additional dampening systems. FIG. 3 illustrates an alternative example.

More specifically, FIG. 3 illustrates a portion of a manifold 300, like the portion of the manifold 100. The manifold 300 may be a portion of the manifold 202. The manifold 300 includes a valve vibration dampening system 302 for independently dampening vibration associated with an in-line valve 304 associated with the flowlines 106. More specifically, the manifold 300 is substantially identical to the portion of the manifold 100 shown in FIG. 1, generally including the first junction 102(1) and the second junction 102(2), a conduit 104(1) connecting the junctions, and the flowlines 106 feeding high-pressure fluid to the junctions 102. Individual of the flowlines 106 also includes an instance of the in-line valve 304. For example, the in-line valve 304 may be configurable to selectively allow high pressure fluid into the junctions 102 and/or to prohibit such flow of fluid. Also in examples, the in-line valve 304 may be a one-way valve that prohibits bi-directional flow, e.g., by only allowing fluid to flow into the junctions 102.

As will be appreciated, in some conventional arrangements, as well as in the arrangement of FIG. 1, the in-line valve 304 may be supported only by portions of the flowline 106 attached to the valve 304. Thus, the valve 304 is suspended above the mounting structure 112 and applies a downward force on the flowline 106. This force may cause stress at the region 126, e.g., at which the flowline 106 meets the junction 102 and/or at junctions of the flowline with the valve 304. The valve vibration dampening system 302 can reduce these stresses by dampening vibration at the valve 304. In the illustrated example, the valve vibration dampening system include a valve mounting plate 306 and a spacer 308 extending above the valve mounting plate 306 to contact the valve 304. Although not illustrated, in examples the valve 304 is fixed to the spacer 308, e.g., using fasteners. For example, the valve 304 may have one or more flanges, feet, and/or other features to facilitate attachment of the valve 304 to the spacer 308. The spacer 308 may have corresponding features, such as threaded holes or the like, to facilitate fastening. As also illustrated in FIG. 3, the valve vibration dampening system 302 can include a plurality of valve vibration dampeners 310.

As with other vibration dampening systems described herein, the valve vibration dampening system 302 can be configured to dampen vibration of the valve 304 with which it is associated, e.g., independently of other components. The valve vibration dampening system 302 may have dampening properties different from the junction vibration dampening systems 128 and/or the flowline vibration dampening system(s) 134. Accordingly, each of the discrete components of the manifold 300 can be dampened relative to the mounting structure 112 and relative to each other. Moreover, although the valve vibration dampening system 302 is shown in FIG. 3 in addition to the junction vibration dampening system 128 and the flowline vibration dampening system(s) 134, in other implementations, the manifold 300 may not include the junction vibration dampening system 128 and/or the flowline vibration dampening system 134. Moreover, the valve vibration dampening system, like the junction vibration dampening system 128 and/or the flowline vibration dampening system(s) 134 may be selectively included, e.g., for fewer than all of the valves 304, the junctions 102, and/or the flowlines 106, respectively. Also like the junction vibration dampening system 128 and/or the flowline vibration dampening system(s) 134 properties associated with the valve vibration dampening system 302 can be varied, e.g., based on a desired dampening. The properties may vary based on a load capacity, e.g., the mass of the valve 304, the valve mounting plate 306 and/or the spacer 308, a hardness of the valve dampeners 310, a number of the valve dampeners 310, vibration frequencies, or the like.

According to FIGS. 1 and 3, manifold components can be individually dampened, e.g., relative to other components of a manifold. Those having ordinary skill in the art will appreciate with the benefit of this disclosure that other components of the fracturing system may be independently dampened. Without limitation, the conduits 104, the fracturing head 222, fluid outlets, and/or any other components that may be prone to failure from stresses and/or may exacerbate such stresses can be independently dampened using techniques like those described herein.

Figure 4:
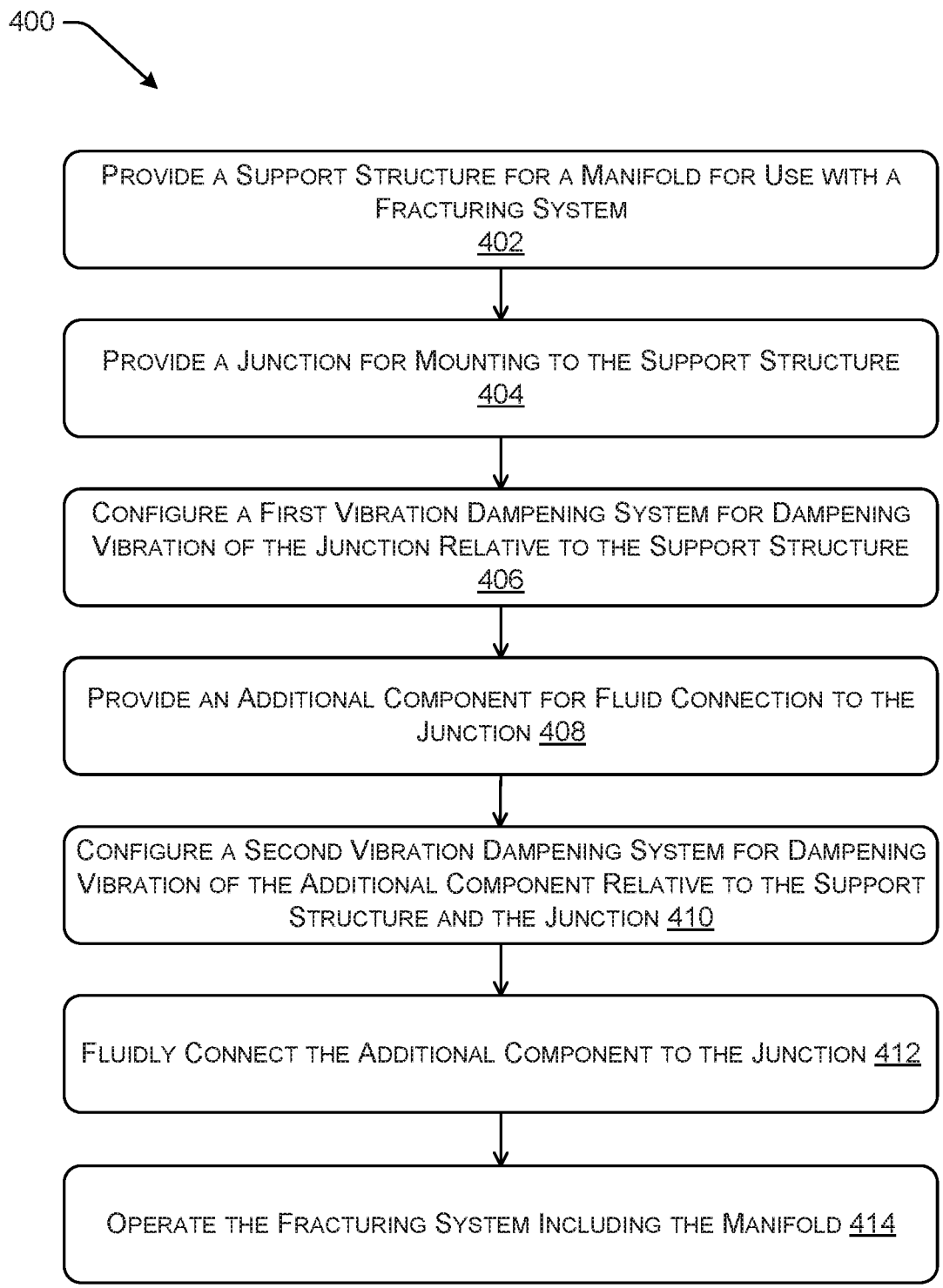
FIG. 4 is a flowchart illustrating a method of assembling a hydraulic fracturing system, in accordance with an example of the present disclosure.

FIG. 4 illustrates an exemplary process 400 for configuring a manifold, such as the manifold 100, the manifold 202, and/or the manifold 300 according to implementations of this disclosure. Although the process 400 is illustrated as a series of ordered steps, the process 400 is not limited to being performed in the order illustrated. Moreover, although the process 400 will be described in connection with the manifolds 100, 202, 300 discussed above, the process 400 is not limited to configuring the manifolds 100, 202, 300, and the manifolds 100, 202, 300 are not limited to being configured using the process 400.

With reference to FIG. 4, the process 400 includes, at an operation 402, providing a support structure for a manifold for use with a fracturing system. As detailed herein, implementations of this disclosure can be used with transportable manifolds, e.g., on trailers, skids, or the like, or with stationary manifolds, e.g., fixed at a location. The operation 402 can include receiving a support structure, like the support structure 108. The support structure 108 can include one or more weldments or fastened portions and may provide one or more mounting surfaces, e.g., for attaching components used in the fracturing system.

At an operation 404, the process 400 includes providing a junction for mounting to the support structure. As detailed herein, a manifold can include a plurality or series of junctions 102 into which pressurized fluid is introduced and transferred for injection into a well bore. For example, the junction 102 can include a mounting plate, such as the junction mount 130 that includes a hole- or bolt-pattern for securing the junction 102 to the support structure.

At an operation 406, the process 400 includes configuring a first vibration dampening system for dampening vibration of the junction relative to the support structure. Instead of securing the junction 102 directly to the support structure, as in conventional systems, aspects of this disclosure include a junction vibration dampening system 128 for dampening vibration of the junction 102 relative to the mounting structure 112 (and the support structure 108. The first vibration dampening system can include one or more vibration dampeners 132 that provide first vibration dampening properties at the junction 102. For instance, the first vibration dampening properties may be selected based on a weight or mass of the junction 102, vibration frequencies, a number of the dampeners 132, a hardness of the dampeners, or the like.

At an operation 408, the process 400 includes providing an additional component for fluid connection to the support structure. In example systems described herein, the junctions 102 may be configured to receive pressurized fluid via one or more flowlines 106 and/or to receive and/or output pressurized fluid to an adjacent one of the junctions 102, e.g., via the conduits 104. Moreover, other hydraulic fracturing components, such as the valves 304, the fracturing head 222, or the like, may also or alternatively be in fluid communication, either directly or indirectly, with the junctions 102.

At an operation 410, the process 400 includes configuring a second vibration dampening system for dampening vibration of the additional component relative to the support structure and the junction. As described, normal operation of a fracturing system can result in large stresses on components of the system, e.g., due to shaking, stroking, cycling, or the like. Such stresses can adversely impact components of the system, as well as junctions between those components. In aspects of this disclosure, vibration dampening is provided to independent components, e.g., to reduce stresses at those components and/or stresses resulting from movement of those components. At the operation 410, a second dampening system is used to dampen vibration at one of those additional components, e.g., independent of the vibration dampening at the junction 102. In the example of FIG. 1, the flowline vibration dampening system 134 dampens vibration at the flowlines 106. In FIG. 3, the valve vibration dampening system 302 dampens vibration at the valves 304. Moreover, because the different components have different properties, e.g., mass, size, etc., the second vibration dampening system can have different vibration dampening properties than the first vibration dampening system. Without limitation, the second vibration dampening system may have more or fewer vibration dampeners, larger or small vibration dampeners, harder or softer vibration dampeners, vibration dampeners dampening vibration in more or fewer degrees of freedom, vibration dampeners having different mechanical components and/or compositions, or the like.

At an operation 412, the process 400 includes fluidly connecting the additional component to the junction. For example, with the junction, and its associated first dampening system, and the additional component, and its associated second dampening system, secured to the support structure, the additional component can be fluidly connected to the junction. For instance, a nut or other fastener may facilitate fastening of the flowlines 106 to the junctions 102 and/or to the valves 304. Similarly, the conduits 104 may be fastened to adjacent junctions 102.

At an operation 414, the process 400 includes operating the fracturing system including the manifold. For example, the manifold may receive low-pressure hydraulic fracturing fluid as described herein, transfer the low-pressure fluid to one or more pumping systems, receive high-pressure fluid from the pumps, e.g., via the flowlines 106 and into the junction 102. The high-pressure fluid may then be transferred to the fracturing head 222 for further transfer to a wellbore.

INDUSTRIAL APPLICABILITY

The present disclosure describes manifolds 100, 202, 300 for use in hydraulic fracturing system (or other fluid pump systems) that incorporate a plurality of dampening systems 128, 134, 302. The manifolds 100, 202, 300 described herein provide improved dampening of vibrations resulting from normal and/or improper use of the system, thereby preventing wear and reducing costs associated with repair and/or replacement of components. In examples, a first component, such as one of the junctions 102 is provided with a first dampening system 128 configured for the first component. For instance, the first dampening system 128 may have first dampening properties, based at least in part on one or more of a mass of the first component, vibration frequencies, a configuration of the dampening system, a number of dampeners used in the system, a hardness rating of the dampeners, or the like. The first dampening system may dampen vibration of the first component relative to a support structure to which the first component has conventionally been fixed. A second component of the manifold, e.g., one of the flowlines 106, the in-line valve 304, or the like, is provided with a second dampening system 134, 302 configured for the second component. For instance, the second dampening system 134, 302 may have second dampening properties, based at least in part on one or more of a mass of the second component, vibration frequencies, a configuration of the second dampening system, a number of dampeners used in the second system, a hardness rating of the dampeners, or the like. The second dampening system may dampen vibration of the second component relative to the support structure and relative to the first component, e.g., independently of the first component.

Providing independent vibration dampening systems for different manifold components according to the techniques described herein provides a number of benefits. For instance, dampening may reduce stresses typically present at junctions of components, especially at welded junctions. Such stresses can result in fractures or other failures, which necessitate repairs and/or replacements to prevent worksite contamination and/or system failures. Accordingly the techniques described herein can reduce downtime and/or costs associated with such repairs and/or replacements.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A fracturing system comprising:
   a chassis;
   a mounting structure including:
      a bottom portion coupled to the chassis; and
      a top portion coupled to the bottom portion;
   a junction;
   a conduit in fluid communication with the junction,
      wherein the conduit is configured to provide a supply of pressurized fluid to the junction;
   a first mount supporting the junction;
   a first vibration dampening system coupling the first mount to the top portion of the mounting structure,
      the first vibration dampening system facilitating a first movement of the first mount and the junction relative to the chassis;
   a second mount supporting the conduit, the second mount being separate from the first mount; and
   a second vibration dampening system coupling the second mount to the top portion of the mounting structure,
      the second vibration dampening system facilitating a second movement of the second mount and the conduit relative to the chassis, and the second movement being different from the first movement.

2. The fracturing system of claim 1, wherein:
   the first vibration dampening system has first vibration dampening properties; and
   the second vibration dampening system has second vibration dampening properties different from the first vibration dampening properties.

3. The fracturing system of claim 2, wherein:
   the first vibration dampening properties include at least one of a first hardness or a first loading capacity; and
   the second vibration dampening properties include at least one of a second hardness or a second loading capacity.

4. The fracturing system of claim 2, wherein:
   the first vibration dampening properties are based at least in part on at least one of a mass of the junction or a mass of the first mount; and
   the second vibration dampening properties are based at least in part on at least one of a mass of the conduit or a mass of the second mount.

5. The fracturing system of claim 1, wherein at least one of the first vibration dampening system or the second vibration dampening system provides dampening in six degrees of freedom.

6. The fracturing system of claim 1, wherein the conduit is a first conduit in fluid communication with a first inlet of the junction, the fracturing system further comprising:
   a second conduit in fluid communication with a second inlet of the junction;
   a third mount supporting the second conduit; and
   a third vibration dampening system coupling the third mount to the top portion of the mounting structure,
      wherein the third vibration dampening system facilitates third movement of the second conduit and the third mount relative to the chassis.

7. The fracturing system of claim 6, wherein the third movement is independent of the first movement and of the second movement.

8. The fracturing system of claim 1, wherein the junction is a first junction, the fracturing system further comprising:
   a second junction in fluid communication with the first junction and receiving pressurized fluid via one or more fluid sources;
   a third mount supporting the second junction,
      wherein the third mount is separate from each of the first mount and the second mount; and
   a third vibration dampening system coupling the third mount to the top portion of the mounting structure,
      wherein the third vibration dampening system facilitates a third movement of the second junction and of the third mount relative to the chassis, the third movement being independent of the first movement and of the second movement.

9. The fracturing system of claim 1, further comprising:
   a valve in fluid communication with at least one of the conduit or the junction; and
   a third vibration dampening system coupling the valve to the top portion of the mounting structure,
      wherein the third vibration dampening system facilitates a third movement of the valve relative to the chassis, the third movement being independent of the first movement and the second movement.

10. The fracturing system of claim 1, wherein:
    the first vibration dampening system comprises separate vibration dampening components disposed at each respective corner of the first mount; and the second vibration dampening system comprises separate vibration dampening components disposed at each respective corner of the second mount.

11. The fracturing system of claim 1, further comprising:
a valve in fluid communication between the junction and the conduit;
a third mount supporting the valve, the third mount being separate from each of the first mount and second mount; and
a third vibration dampening system coupling the third mount to the top portion of the mounting structure,
the third vibration dampening system facilitating a third movement of the third mount and the valve relative to the chassis, and
the third movement being different from each of the first movement and the second movement.

12. The fracturing system of claim 1, wherein the conduit is a first conduit, the fracturing system further comprising:
a second conduit in fluid communication with the junction;
a third mount supporting the second conduit, the third mount being separate from each of the first mount and second mount; and
a third vibration dampening system coupling the third mount to the top portion of the mounting structure,
the third vibration dampening system facilitating a third movement of the third mount and the second conduit relative to the chassis, and
the third movement being different from each of the first movement and the second movement.

13. A method of configuring a manifold for use in a hydraulic fracturing system, the method comprising:
providing a support structure comprising:
a chassis;
a mounting structure including:
a bottom portion coupled to the chassis; and
a top portion coupled to the bottom portion;
a first mount coupled, via a first vibration dampening system, to the top portion of the mounting structure; and
a second mount coupled, via a second vibration dampening system, to the top portion of the mounting structure,
wherein the second mount is separate from the first mount;
providing a junction for securing to the first mount;
configuring the first vibration dampening system to dampen vibration of the junction relative to the support structure, via the first mount, and secure the junction to the support structure, via the first mount, the first vibration dampening system having first vibration dampening properties;
providing a hydraulic fracturing component for fluid connection to the junction;
configuring the second vibration dampening system to dampen vibration of the hydraulic fracturing component relative to the support structure, via the second mount, and secure the hydraulic fracturing component to the support structure, via the second mount, the second vibration dampening system having second vibration dampening properties different from the first vibration dampening properties; and
fluidly connecting the hydraulic fracturing component to the junction.

14. The method of claim 13, wherein a flowline is configured to provide pressurized fluid to the junction, and wherein the hydraulic fracturing component comprises at least one of the flowline or a valve associated with the flowline.

15. The method of claim 13, wherein:
the first vibration dampening properties include at least one of a first hardness or a first loading capacity; and
the second vibration dampening properties include at least one of a second hardness or a second loading capacity.

16. The method of claim 13, wherein at least one of the first vibration dampening system or the second vibration dampening system provides dampening in six degrees of freedom.

17. A hydraulic fracturing manifold comprising:
a chassis;
a mounting structure including:
a bottom portion coupled to the chassis; and
a top portion coupled to the bottom portion;
a first mount coupled, via a first one or more vibration dampeners, to the top portion of the mounting structure;
a second mount coupled, via a second one or more vibration dampeners, to the top portion of the mounting structure;
a third mount coupled, via a third one or more vibration dampeners, to the top portion of the mounting structure;
wherein each of the first, second, and third mounts are separate from each other and configured to be independently dampened;
a junction coupled to the first mount;
a first flowline coupled to the second mount, wherein the first flowline is in fluid communication with the junction, and wherein the first flowline is configured to receive fluid from a first pump; and
a second flowline coupled to the third mount, wherein the second flowline is in fluid communication with the junction, and wherein the second flowline is configured to receive fluid from a second pump.

18. The hydraulic fracturing manifold of claim 17, further comprising a fourth mount coupled, via a fourth one or more vibration dampeners, to the top portion of the mounting structure, wherein the fourth mount is separate from each of the first, second, and third mounts.

19. The hydraulic fracturing manifold of claim 18, further comprising a valve coupled to the fourth mount, wherein the valve is in fluid communication between the first flowline and the junction.

20. The hydraulic fracturing manifold of claim 17, wherein:
the first one or more vibration dampeners include a first plurality of separate dampeners disposed at respective corners of the first mount;
the second one or more vibration dampeners include a second plurality of separate dampeners disposed at respective corners of the second mount; and
the third one or more vibration dampeners include a third plurality of separate dampeners disposed at respective corners of the third mount.

* * * * *